Figure 1:
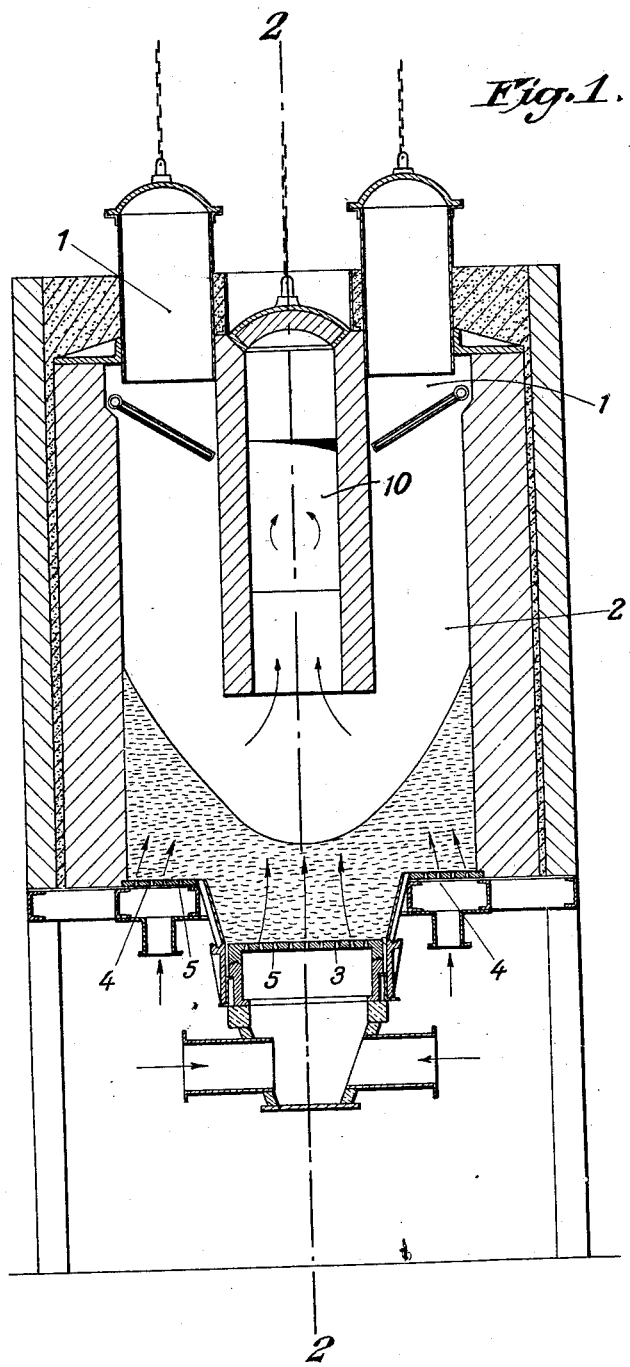

Dec. 29, 1931.  O. UHDE ET AL  1,838,596
METHOD OF AND APPARATUS FOR THE INCINERATION
OF REFUSE AND SIMILAR WASTE MATERIALS
Filed Jan. 22, 1929  2 Sheets-Sheet 2
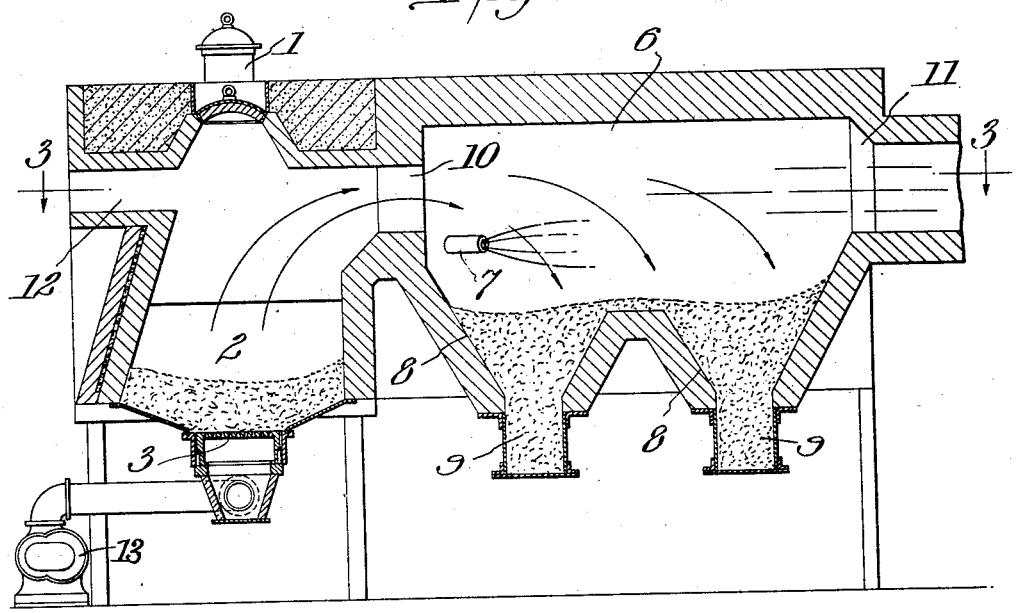
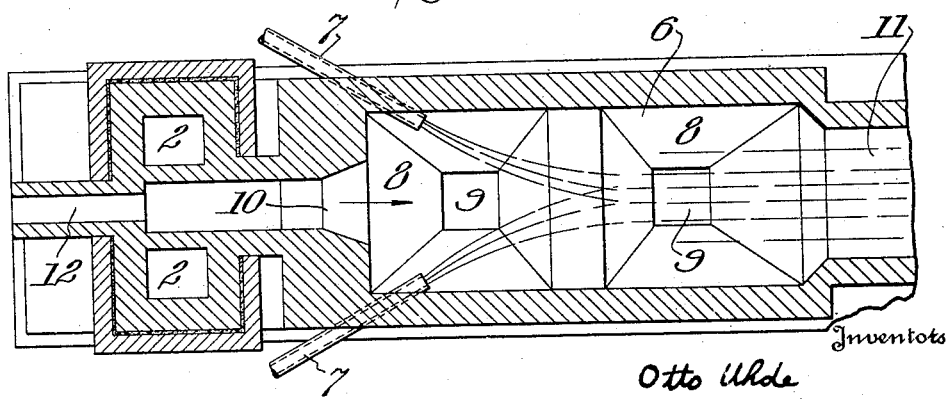
Inventors:
Otto Uhde
Victor Kolb
By Byrnes, Townsend & Brickenstein
Attorneys.

Patented Dec. 29, 1931

1,838,596

UNITED STATES PATENT OFFICE

OTTO UHDE, OF HAMBURG, AND VICTOR KOLB, OF FRANKFORT-ON-THE-MAIN, GERMANY

METHOD OF AND APPARATUS FOR THE INCINERATION OF REFUSE AND SIMILAR WASTE MATERIALS

Application filed January 22, 1929, Serial No. 334,279, and in Germany August 3, 1926.

This invention relates to a method of and apparatus for the incineration of refuse and similar waste materials.

The incineration of refuse and similar waste materials is, as is known, preferably carried out in shaft furnaces. The shaft of the furnace is closed at the bottom by a grate through which the combustion air which may if desired be preheated, is supplied to the refuse preferably under pressure. Boshes or auxiliary grates are frequently arranged adjacent to the grate, for the purpose of facilitating the retention of certain quantities of the glowing residue when the ashes or slag from the refuse is raked out. The residue is placed on the grate prior to the introduction of a fresh charge and serves to ignite said charge. The charging operation has hitherto usually been effected by means of the customary charging devices in such a manner that the refuse is uniformly distributed over the grate.

The capacity of furnaces for the incineration of refuse can be considerably increased by the employment of peripheral charging which is known per se for other purposes, such as for example, for reverberatory furnaces and producers. This method of charging is also employed in the present invention. The refuse is supplied in such a manner that it falls down along the walls of the furnace which are preferably vertical or else outwardly inclined, with the result that it is piled up higher round the walls or boshes whilst the middle of the grate is covered only with a relatively thin layer which consists of the coarser portions of the refuse, which as is known, roll down towards the centre of the furnace from the peripherally introduced charge, more easily than the fine refuse.

The invention utilizes the fact that in the previously proposed methods of charging a higher blast pressure can be employed than is the case with furnaces without peripheral charging. In the case of the latter, with higher pressures, a great part of the blast rises along the walls and is therefore not utilized completely in the combustion, but dilutes the combustion gases and cools them down to an unnecesary extent, with the result that not only is the whole combustion process adversely affected, but moreover the combustion process as such is protracted.

The present invention also utilizes the advantage inherent in peripheral charging that the easily combustible layer of refuse in the middle of the grate which is considerably thinner and which on account of its composition consists of particularly coarse and easily combustible material, is consequently raised to a red heat with great rapidity. Hot combustion gases are also readily produced in this zone, although the bulk of the refuse round the wall of the shaft has not as yet been heated to ignition temperature. This offers the advantage that the gases produced by dry distillation from the refuse which has not yet been ignited, are ignited very shortly after the introduction of the charge and are no longer led off without utilization for a considerable time as was hitherto the case. Moreover the ignition of the refuse located round the furnace walls is greatly accelerated by the radiation from the hot flame gases which are produced in the centre of the grate.

The process for the incineration of refuse and other waste materials in shaft furnaces forming the subject of the present invention consists essentially in that the refuse which is heaped up at the walls of the shaft to a greater height than in the centre of the furnace is sifted by means of the combustion blast introduced under high pressure through the grate, whereby refractory fine particles of refuse are carried off by the furnace gases and deposited in a dust chamber.

It has already been proposed to combine sifting by means of a blast with the incineration of refuse in the incineration chamber, this operation proceeding in a hygienic manner and without objection under the protection of the fire and without formation of dust in the working space occupied by the operators. Since, however, according to this known process the blast sifting is preceded by a sifting by means of inclined surfaces, so that the blast is at the same time a transporting agent for the whole of the fine material which has been mechanically separated on the inclined surfaces, the problem of sifting similar materials has thus not yet been solved. This drawback is particularly noticeable insofar as the sifted material still consists of both refractory and easily fusible constituents which are present moreover in quite varying proportions.

By combining blast-sifting with peripheral charging in accordance with the present invention, the refractory portions only of the finely divided refuse are removed from the unsorted material and are conveyed into a dust chamber by means of an air current which effects the sifting operation. As in the case of peripheral charging, the refuse does not lie so thickly over the middle of the grate as around the walls of the furnace shaft, the blast is able to penetrate the refuse on the middle of the grate and the fine particles of refuse which are less combustible may be led off as easily as possible without hindrance. In this manner and also on account of the simultaneous shrinking of the refuse lying over the grate, due to slagging, the bulk of the refuse which is heaped up higher at the side becomes attacked to a greater extent so that this refuse gradually slides down towards the centre and is then subjected to the same sifting treatment as the refuse which has been slagged there in the meantime.

If another method of charging were selected for example, if the refuse were distributed throughout to approximately the same depth, the blast-sifting could hardly be carried out at all if a greater rate of charging were employed, and in particular it would break down after each charging operation since the particles of fine refuse driven off from the lower layers of the charge would be again deposited in the upper layers of the same.

The more easily fusible portions of the fine refuse moreover rapidly sinter with the coarser portions under the action of the fire in the new method and they are therefore retained and promote the formation of a slag which is firmly cemented together and which moreover, on account of the separation of the refractory sandy portions of the fine refuse, is obtained in a very pure state. The deposited refractory fine refuse constitutes a relatively simple body of uniform composition which can easily be further worked up by fusion, with the addition of certain fluxes such as for example lime, into an excellent paving stone composition of very uniform quality.

Inasmuch as the furnace is partially discharged by the separation of the refractory constituents, it is possible in this manner to increase the capacity of the grate to more than double the quantity which can be put through according to known methods.

The residues of the incineration from a furnace operating according to the method of the present invention must be removed at short intervals on account of the increased capacity. The apparatus employed for discharging the residues of the combustion are therefore exposed to considerably higher temperatures, than was the case with the older refuse incineration methods, due on the one hand to the frequent use thereof and on the other hand to the rapid and intensive combustion of the refuse in the furnace. The elevated temperatures do not operate solely on the material of the discharging mechanism but also upon the brickwork lining of the furnace which thus alters its shape to an increased degree under the influence of these elevated temperatures. This alteration of shape may have the effect of setting up difficulty in the introduction of the discharging mechanism in the furnace after a certain period of use. The higher output attained by the present method necessitates a special construction of the apparatus with which the residues from the incineration of the refuse are to be removed from the furnace. This special construction is more particularly described and claimed in our divisional application Serial No. 434,984, filed March 11, 1930.

In order more clearly to understand the invention reference is made to the accompanying drawings in which:—

Fig. 1 shows a sectional elevation of a shaft furnace which is particularly suitable for carrying out the method hereinbefore set forth.

Figs. 2 and 3 show a vertical section on the lines 2—2 of Figs. 1 and 3 and a horizontal section on the line 3—3 of Fig. 2, respectively, of a furnace similar to that of Fig 1, in conjunction with a chamber for separating and burning of the refractory fines carried over by the combustion blast.

The same reference characters denote the same or corresponding parts in all of the figures.

The refuse is charged into the furnace space proper 2 through two charging shafts 1 in the upper portion of the furnace. In order that no disturbing influence may operate during the working of the furnace, the shafts are closed by duplicate closing devices. The refuse falls on to the grate 3 which is provided with tuyères, special boshes 4, for igniting the refuse being provided at the sides, if desired. The bulk of the refuse piles up over the boshes 4. The more finely divided portions of the refuse tend to remain on the boshes 4 whilst the coarser portions roll down the slopes which are thus formed, towards the middle. The upper limits of the charge have an outline similar to that shown in Fig. 1.

The refuse is rapidly ignited and incinerated in the furnace after each charging operation. The less combustible fine refuse is whirled up by the combustion blast and is carried over with the combustion gases into a separate dust chamber 6 in which it falls to the bottom and is burnt; the gases from the furnace 1 passing into the dust chamber 6 through opening 10 and passing out through opening 11. 12 is a working opening for the introduction of poking irons and the like. A blower adapted to produce a pulsating blast of air is shown at 13. Supplementary firing may be provided in the dust chamber 6 in order still more to accelerate and to complete the combustion.

The burner nozzle or nozzles 7 of the supplementary firing device are preferably so arranged that their flame gases develop under the stream of fine refuse which enters the dust chamber. The portions of fine refuse which pass on their way to the bottom 8 of the dust chamber must first fall through the flame gases of the supplementary firing device which thus accelerates the incineration of the same to a considerable degree. In order to effectively carry over the fine refuse into the dust chamber it is advisable not only to provide air tuyères 5 in the grate proper 3 but also—according to their construction—in the boshes 4 for igniting the refuse. In the bottom 8 of the dust chamber are provided discharge openings, which are furnished with the usual closures 9.

In carrying out the hereindescribed method, it has been found that the blast-sifting is best effected by employing pulsating air jets such as can be produced for example, by means of rotary blowers communicating with a grate provided with tuyères which has a high resistance to spalling. The blast thus operates in short and rapidly successive jets upon the charge and thus effects an easier and more complete separation of the less combustible fine refuse.

We claim:—

1. Process for the incineration of refuse in shaft furnaces which comprises charging the refuse into the furnace at the periphery thereof in such a manner that the bed of charge is thicker at the periphery than at the center of the furnace, igniting the charge and subjecting it to the sorting action of a blast of air whereby the refractory fine particles are carried away and thereafter separating the fine particles from the air blast in a dust chamber.

2. Process for the incineration of refuse in shaft furnaces which comprises charging the refuse into the furnace at the periphery thereof in such a manner that the bed of charge is thicker at the periphery than at the center of the furnace, igniting the charge and subjecting it to the sorting action of a pulsating blast of air whereby the refractory fine particles are carried away and thereafter separating the fine particles from the air blast in a dust chamber.

3. Process for the incineration of refuse in shaft furnaces which comprises charging the refuse into the furnace at the periphery thereof in such a manner that the bed of charge is thicker at the periphery than at the center of the furnace, igniting the charge and subjecting the charge at its center to the sorting action of a blast of air whereby the refractory fine particles are carried away and thereafter separating the fine particles from the air blast in a dust chamber.

4. Process for the incineration of refuse in shaft furnaces which comprises charging the refuse into the furnace at the periphery thereof in such a manner that the bed of charge is thicker at the periphery than at the center of the furnace, igniting the charge and subjecting the charge at its center and at its periphery to the sorting action of a blast of air whereby the refractory fine particles are carried away and thereafter separating the fine particles from the air blast in a dust chamber.

In testimony whereof we affix our signatures.

VICTOR KOLB.
OTTO UHDE.